United States Patent [19]

Kitajima et al.

[11] 3,714,065

[45] Jan. 30, 1973

[54] PROCESS FOR PREPARING A MICRO CAPSULE

[75] Inventors: Masao Kitajima, Asaji Kondo, both of Saitama; Masataka Morishita, Jinnosuke Abe, both of Shizuoka, all of Japan

[73] Assignee: Fuji Photo Film Co., Ltd., kanagawa; Toyo Jazo Co., Ltd., Shizuoka, both of Japan

[22] Filed: Feb. 3, 1971

[21] Appl. No.: 112,394

[30] Foreign Application Priority Data

Feb. 3, 1970 Japan .................................45/9382

[52] U.S. Cl.................252/316, 96/66.1, 117/100 A, 117/100 B, 252/314, 424/33, 424/35, 424/37, 424/94, 424/127, 424/280
[51] Int. Cl..........B01j 13/02, B44d 1/02, A61k 9/04
[58] Field of Search .....252/316; 117/100 A; 424/33, 424/35

[56] References Cited

UNITED STATES PATENTS

| | | | |
|---|---|---|---|
| 3,415,758 | 12/1968 | Powell et al. | 252/316 |
| 3,137,630 | 6/1964 | Hecker et al. | 264/14 |
| 3,161,602 | 12/1964 | Herbig et al. | 252/316 |

*Primary Examiner*—Richard D. Lovering
*Attorney*—Sughrue, Rothwell, Mion, Zinn & Macpeak

[57] ABSTRACT

A process for preparing microcapsules which comprises; dissolving a film-forming polymer in an organic solvent to form a solution, said solvent having a dielectric constant between 10 and 40 and a poor compatibility with liquid paraffins and silicone oils; dispersing a core substance in the solution, to form a first dispersion; dispersing said first dispersion in an encapsulating medium comprising a liquid paraffin or a silicone oil in the form of fine droplets; and evaporating the solvent and the encapsulating medium from the dispersion.

16 Claims, No Drawings

PROCESS FOR PREPARING A MICRO CAPSULE

BACKGROUND OF THE INVENTION

1. Field of the Invention

This invention relates to a process for preparing microcapsules.

2. Description of the Prior Art

Many and varied methods for preparing microcapsules are known in the art. For example, encapsulating methods using liquid paraffin as a medium are described in U.S. Pat. Nos. 2,379,817 and 2,275,154 and Japanese Pat. Publication No. 3700/61; however, it is impossible to encapsulate a hydrophilic material by these methods because gelatin is used as the film-forming material therein. The methods described in U.S. Pat. Nos. 3,423,489 and 3,361,632 and Japanese Pat. Publication No. 5911/64 cannot be used for encapsulating a heat-sensitive material because heating and cooling operations are required therein since only a waxy substance liquified by heat is used as the film-forming material.

Further, the methods described in Japanese Pat. Publication Nos. 11,914/69 and 11,915/69 require special apparatus such as a double concentric cylinder for separating the core substance and the film-forming material encapsulating them in liquid paraffin by solvent extraction.

It is an object of the present invention to remedy the above-disadvantages.

It is a further object of the present invention to provide an encapsulating method wherein hydrophilic and heat-sensitive materials can be easily encapsulated.

It is yet another object of the present invention to provide a method of encapsulation wherein the encapsulation can be effected using only simple apparatus, such as a stirrer.

SUMMARY OF THE INVENTION

More particularly, it relates to a process for preparing microcapsules by dissolving a film-forming polymer in a solvent having a dielectric constant between 10 and 40, wherein the solvent has a poor compatibility with liquid paraffins and silicone oils; dispersing a core substance in the resulting solution; dispersing, in the form of fine droplets, the resulting dispersion in an encapsulating medium comprising a liquid paraffin or a silicone oil; and evaporating the solvent and the encapsulating medium.

DESCRIPTION OF PREFERRED EMBODIMENTS

In this specification, "film-forming polymer" or "film-forming material" indicates a polymer capable of forming a microcapsule wall. The microcapsules produced by the present process have a particle diameter of about from 50 microns to 5 mm. The material used as the core material for the preparation of microcapsules according to the present invention is any solid powder insoluble in the solvent for the film-forming polymer or a polymer solution thereof. The water solubility of the core substance is immaterial, as long as it is insoluble in the polymer solvent. Thus, the present invention is applicable to a great many core materials.

The process of the present invention will be generally described below.

A film-forming polymer is first dissolved in a solvent having a dielectric constant of 10 to 40, preferably 15 to 35, and the core substance is then dispersed in this solution. The resulting dispersion is added to a liquid paraffin or silicone oil medium, prepared in another vessel, under stirring and is emulsified in fine droplet form. The particle size of the emulsion droplets is dependent on the stirring velocity, the stirring means and the method of addition of the dispersion liquid. When the solvent for polymer is evaporated at ordinary temperature or elevated temperature or under reduced pressure while continuing the stirring, the film-wall of polymer is formed and a spherical or near-spherical microcapsule is obtained.

A specific embodiment of the present process is described below for a better understanding of the invention, in which an enzyme powder is employed as the core substance to be micro-encapsulated, an enteric cellulose acetate phthalate (hereinafter referred to as CAP) is used as the film-forming polymer, and a liquid paraffin is used as the encapsulating medium.

The enzyme is dispersed in a solution of CAP dissolved in acetone and the dispersed liquid is then added dropwise into liquid paraffin maintained at 15° C under stirring to emulsify it to the extent of 0.5 to 1.5 mm in oil drop size. When the temperature is raised to 25° to 35° C while continuing the stirring, acetone is evaporated together with liquid paraffin to precipitate a solid film of CAP, and an enzyme-containing CAP capsule of 0.5 to 1.5 mm in size is thereby produced.

In the above example, acetone and liquid paraffin (i.e., the polymer solvent and encapsulating medium, respectively) are scarcely miscible, since acetone has a dielectric constant of 2.07 and liquid paraffin about 2. Acetone only scarcely dissolves liquid paraffin and liquid paraffin dissolves acetone in an amount of about only 10 percent. Further, the CAP is soluble in the acetone but insoluble in the liquid paraffin. By this method an enzyme which is unstable to the change of both pH and heat and is soluble in water can be microencapsulated.

The combinations of polymer and solvent, which may be used in the present process, are exemplified as follows, with one skilled in the art being able to select an appropriate solvent for any film-forming polymer.

| Polymer | Solvent |
| --- | --- |
| Cellulose acetophthalate | Acetone |
| Acrylic acid-acrylic acid ester copolymer | Acetone-ethanol (1 : 1 by weight) |
| Shellac | Ethanol |
| Cellulose acetate-N,N-di-n-butylhydroxypropyl ether (gastric polymer)* | Acetone-ethanol (1 : 1 by weight) |
| Copolymer of 2-methyl-5-vinylpyridine, methyl acrylate and methacrylic acid | Acetone-ethanol (1 : 1 by weight) |
| Polyvinylpyrrolidone | Acetone or ethanol |
| Polyvinyl alcohol | Ethanol |
| Vinylmethylether-maleic anhydride copolymer | Acetone or Acetone-ethanol (1 : 1 by weight) |
| Methylmethacrylate-maleic anhydride copolymer | Acetone or Acetone-ethanol (1 : 1 by weight) |
| Styrene-maleic anhydride copolymer | Acetone or Acetone-ethanol (1 : 1 by weight) |

*CABP

Examples of other film-forming polymers are a copolymer of methyl acrylate and methacrylic acid, and a complex of gelatin and alkyl sulfate.

The solvents which may be used in the process of the present invention and their dielectric constants are as follows:

| | |
|---|---|
| Methanol | 32.6 |
| Ethanol | 24.3 |
| Isopropanol | 18.7 |
| Butanol | 17.1 |
| Benzyl alcohol | 13.1 |
| Ethylene glycol | 37.7 |
| Propylene glycol | 35.0 |
| Phenol | 9.8 |
| Acetone | 20.7 |
| Acetic acid | 9.7 |
| Acetic acid anhydride | 20.7 |
| Nitromethane | 35.9 |
| Ethylene diamine | 14.2 |
| Acetic acid Cellosolve | 16 |

Other solvents having the proper dielectric constant and which are not compatible with the encapsulating medium are included within the scope of the present invention, one skilled in the art being readily able to select such solvents based on the present disclosure.

For example, cyclohexane and methylethylketone, etc., cannot be used in the process of the present invention even though their dielectric constants are within the range of 10 to 40 because they are very compatible with liquid paraffin. The solvent for the polymer is required to be not soluble or only slightly soluble in liquid paraffin or silicone oil, which is the encapsulating medium; that is, is required to be so-called poorly compatible with the encapsulating medium.

In case of using a mixture of solvents, the dielectric constant of the mixture may be in the range of 10 to 40, preferably 15 to 35.

In the process of the present invention, although the ratio of core substance to film-forming polymer is optional, when 1/5 to 10 parts by weight of the film-forming polymer are used per 1 part by weight of the core substance, the encapsulating operation can be easily conducted and the wall-film of the resulting capsule is strong. The amount by weight of the liquid paraffin or silicone oil to be used as the encapsulating medium is suitably four to 15 times that of the dispersion liquid of the core substance in the polymer solution since, if it is too small, the capsules easily adhere to each other and form lumps, and, if too large, the production and recovering of the capsules are complicated.

A typical example of a liquid paraffin is liquid paraffin itself, and, among No. 1 to No. 4 thereof, No. 4, which is high in viscosity, is easy to use. Further, paraffins identified by the Japanese Pharmacopoeia and halogenated paraffins can also be employed.

The silicone oil may be, for example, methyl silicone oil, phenyl silicone oil, or methylphenyl silicone oil. The silicone oil chosen preferably has a viscosity of about 50 to 500 cp at 25° C; however, the utilization thereof is limited because its compatibility with the polymer solvent is higher than that of liquid paraffin.

The evaporation of the solvent and the encapsulation medium may be conducted at a temperature lower than the boiling points thereof. In addition, the temperature may be higher than room temperature (25°C).

The process of the present invention is characterized in that:

1. a water soluble material can be efficiently encapsulated;

2. a material unstable to heat can be encapsulated;

3. as the film-forming polymer, a stomach-soluble polymer which solutes only in the range of lower pH and an enteric soluble polymer which solutes only in the range of higher pH, etc., can be widely utilized;

4. the capsules can be easily arranged in the desired particle size since the encapsulating medium is considerably viscous; and 5. the present process is suitable for encapsulating medicines and substances having strong reactivity since the encapsulating medium employed is the most inert (with respect to solubility, reactivity and toxicity) among materials known at the present time.

The present invention is more specifically described by the following examples, which are intended as illustrative rather than limiting in nature:

EXAMPLE 1

Twenty g of corn starch and 20 g of antiphlogistic enzyme powder (Letiquinonase, manufactured by Toyo Jozo Co., Ltd.) were dispersed in a solution of 100 g of cellulose acetate phthalate (100 cps, enteric polymer, manufactured by Wako Junyaku Co.) dissolved in 500 ml of acetone. On the other hand, as an encapsulating medium, 60 g of corn starch was dispersed in a solution of 60 ml of an emulsifier (trade name: Supan 85 manufactured by Kao Atlas Co.) dissolved in 6 liters of liquid paraffin (JIS No. 4) and cooled to 5° C.

The enzyme dispersion was added to the encapsulating medium under stirring to produce finely divided droplets of 0.5 to 1 mm in size. By continuing the stirring while slowly raising the temperature to 25° C for 5 hours, acetone was totally evaporated to precipitate out a solid film of CAP, and the film encapsulated the enzyme and corn starch to produce microcapsules of 0.5 to 1 mm in size. By washing the liquid paraffin adhered on the capsule wall with benzene and drying, 200 g of microcapsules were obtained.

The microcapsules prepared by the above-described process had about 90 percent of the original enzyme activity (i.e., the protein decomposition activity in the antiphlogistic enzyme (Letiquinonase) and its deactivation were scarcely observed in the microencapsulation process). When these capsules were shaken in an artificial gastric juice (Japanese Pharmacopoeia) for 30 minutes and dissolved in an artificial intestinal juice and the enzyme activity was then measured by the Anson-Kniz Method, it was found that an uncapsulated enzyme was deactivated in the artificial gastric juice (to 0 in activity) while in the capsulated enzyme, 80 percent of the activity remained protected from the gastric juice.

EXAMPLE 2

Antiphlogistic enzymes, quinonase (manufactured by Toyo Jozo Co., Ltd.), Letiquinonase (manufactured by Toyo Jozo Co., Ltd.), and Pronase P (manufactured by Kaken Kagaku Co.) were microcapsulated in the same manner as in the process described in Example 1, and, in this case by using 700 ml of acetone and by increasing the stirring velocity over that used in Example 1, and microcapsules of 0.1 – 0.2 mm in size were obtained. Comparing the antiphlogistic effect of the above-described microencapsulated enzyme with that of the uncapsulated enzyme, the good results obtained are as follows:

That is, when measuring the rate of dropsy control by oral administration of drugs by anti-serum dropsy controlling action of rats and rabbits according to Mr. Yamazaki's method (Arch, Int Pharmacodyn, Belgium, 166, 387 (1967) or Punch's method (Journal of Japan Pharmacology Association 60, 65 (1964) in 50 mg/Kg of enzyme administered, the microencapsulated quinonase, letiquinonase and pronase P exhibited remarkable medicinal effects; i.e., a control rate of 48.4, 50.9 and 31.3 percent, respectively, while all the corresponding uncapsulated enzymes exhibited a 0 percent rate. Further, in 100 mg/kg of enzyme administered, the microencapsulated quinonase, letiquinonase and pronase P exhibited a control rate of 71.9, 80.5 and 64.2 percent, respectively, while the control rate of the corresponding uncapsulated enzymes were 67.5, 69.7 and 49.7 percent, respectively.

EXAMPLE 3

According to the process described in Example 1, using pancreatine (manufactured by Mikuni Kagaku Co.) and pig tripsine (manufactured by Novo Industry Co.) as the core substances, the respective microcapsules were obtained. These microencapsules, as the result of measurement, exhibited remaining activity of 96 percent, for the pancreatine, and 94.5 percent for the pig tripsine.

EXAMPLE 4

One g of CABP (gastric) cellulose-type polymer (manufactured by Wako Junyaku Co.) was dissolved in 30 mg of methanol and 4 g of L-ascorbic acid powder was dispersed therein. 200 ml of silicone oil (trade name: KF 50, methyl phenyl silicone, 100 cp; manufactured by Shinetsu Chemical Co.) dispersed with 4 g of lactose was prepared as an encapsulating medium, and the enzyme dispersion liquid was added thereto under stirring at an ordinary temperature to emulsify the same to about 200 μ in size.

By continuing the stirring for 2 hours, methanol was evaporated to quantitatively obtain CABP capsules of 200 μ in size which encapsulated Vitamin C. This capsule dissolved in a pH of below 4.

EXAMPLE 5

Five g of powder of toluylene diamine hydrochloride, which is a color developer for color photography, was dispersed in a solution of 2.5 g of CAP dissolved in 25 ml of acetone. Two hundred ml of liquid paraffin was added to the above dispersion liquid under stirring at 15° C. The temperature of the system was raised to 30° C and the stirring was continued for 2 hours.

A yellow developer capsule of 1 to 3 mm in size was obtained. The capsule was easily soluble in an aqueous alkaline solution of above 9 in pH but was insoluble in acidic pH.

EXAMPLE 6

Five g of sodium carbonate powder was dispersed in a solution of 1.25 g of CABP dissolved in 25 ml of methanol. The above dispersion liquid was suspended in the form of droplets of 0.5 to 1 mm in size in 200 ml of fluid paraffin containing 3 g of silica powder. By heating at 40° C for 1.5 hours, methanol was evaporated to obtain gastric capsules of CABP of 0.5 to 1 mm in size, encapsulating sodium carbonate therein. The capsules are used for the buffering of pH and function such that, when the pH is lowered to below 4, the wall film dissolves to practically efflute sodium carbonate to thereby raise the pH.

What is claimed is:

1. A process for preparing microcapsules which comprises; dissolving a film-forming polymer which forms a protective microcapsule wall on the core material in an organic solvent to form a solution, said solvent having a dielectric constant between 10 and 40 and a poor compatibility with liquid paraffins and silicone oils; dispersing a core substance in the solution to form a first dispersion; dispersing said first dispersion in an encapsulating medium comprising a liquid paraffin or a silicone oil in the form of fine droplets; and evaporating the solvent and the encapsulating medium from the dispersion whereby said microcapsules are formed.

2. The process as claimed in claim 1 wherein said solvent is methanol, ethanol, isopropanol, butanol, benzyl alcohol, ethylene glycol, propylene glycol, phenol, acetone, acetic acid, acetic anhydride, nitromethane, ethyl-enediamine, acetic acid Cellosolve or mixtures thereof.

3. The process as claimed in claim 1 wherein said polymer is cellulose acetate phthalate, an acrylic acid/acrylic acid ester copolymer, shellac, cellulose acetate-N, N-di-n-butylhydroxypropyl ether, a 2-methyl-5-vinyl-pyridine/methyl acrylate/methacrylic acid copolymer, polyvinyl pyrrolidone, polyvinyl alcohol, a vinylmethylether/maleic anhydride copolymer, a methyl-methacrylate/maleic anhydride copolymer, a styrene/maleic anhydride copolymer, a methyl methacrylate/methacrylic acid copolymer or a complex of gelatin and alkyl sulfate.

4. The process as claimed in claim 1 wherein the dielectric constant of said solvent varies from about 15 to about 35.

5. The process as claimed in claim 1 wherein said fine droplets vary in size from 0.5 to 1.5 mm.

6. The process as claimed in claim 1 wherein from 1/5 to 10 parts by weight of said film-forming polymer are employed to each 1 part by weight of said core substance.

7. The process as claimed in claim 1 wherein the encapsulating medium is employed in an amount of four to 15 times by weight of the first dispersion.

8. The process as claimed in claim 1 wherein said core substance is an enzyme.

9. The process as claimed in claim 1 wherein said core substance is a solid powder insoluble in said solvent.

10. The process as claimed in claim 1 wherein said microcapsules have a diameter of from 50 microns to 5 millimeters.

11. The process as claimed in claim 1 wherein said silicone oil is methyl silicone oil, phenyl silicone oil or methylphenyl silicone oil.

12. The process as claimed in claim 1 wherein said silicone oil has a viscosity at 25° C of from 50 to 500 cp.

13. The process as claimed in claim 1, wherein said film-forming polymer is a resinous polymer which is insoluble in the encapsulating medium.

14. The process of claim 1, wherein said solvent is substantially immiscible with liquid paraffins and silicone oils.

15. The process of claim 1, wherein the core substance is insoluble in the solvent.

16. The process of claim 1, wherein a mixture of solvents is used, which mixture has a dielectric constant of from 10 to 40.

* * * * *